United States Patent [19]

Warnick et al.

[11] Patent Number: 5,121,942
[45] Date of Patent: Jun. 16, 1992

[54] AIRBAG COVER ASSEMBLY AND METHOD OF FORMING SAME

[75] Inventors: David Warnick, Rochester; William Humphrey; Lawrence Nichols, both of Dover, all of N.H.

[73] Assignee: Davidson Textron Inc., Dover, N.H.

[21] Appl. No.: 644,207

[22] Filed: Jan. 22, 1991

[51] Int. Cl.[5] .............................................. B60R 21/16
[52] U.S. Cl. ...................................... 280/732; 280/743
[58] Field of Search ............... 280/728, 731, 732, 743

[56] References Cited

U.S. PATENT DOCUMENTS

| | | | |
|---|---|---|---|
| 3,794,349 | 2/1974 | Fuller | 280/732 |
| 3,904,222 | 9/1975 | Byrsott et al. | 280/732 |
| 4,878,689 | 11/1989 | Mitzkus et al. | 280/743 |
| 4,925,209 | 5/1990 | Sakurai | 280/743 |
| 4,989,897 | 2/1991 | Takada | 280/732 |

*Primary Examiner*—Kenneth R. Rice
*Attorney, Agent, or Firm*—John P. Moran; John C. Evans

[57] ABSTRACT

An airbag cover assembly for the passenger side of an automobile. The assembly includes an exterior skin, a pair of underlying sub-assemblies, each including a U-shaped galvanized steel strip, a short nylon scrim and a long glass mat sandwiched therebetween and extending therefrom such that a narrow space exists between adjacent edges of the glass mats. A weakening notch is formed across the inside surface of the exterior skin along the center line of the narrow space. A low density polyurethane foam is injected into a foaming tool cavity bearing the skin and pair of sub-assemblies. When cured, the foam covers the nylon scrims and glass mats and becomes immersed throughout the interstices of each, serving as the body of the final assembly. The glass mats prevent fragmentation of the low density foam upon deployment of the airbag.

7 Claims, 2 Drawing Sheets

AIRBAG COVER ASSEMBLY AND METHOD OF FORMING SAME

TECHNICAL FIELD

This invention relates generally to vehicular airbag deployment doors and, more particularly, to a low density rigid polyurethane foam hingeable door.

BACKGROUND ART

Heretofore, air bag cover constructions have generally included a vinyl or urethane outer skin, a semi-rigid or somewhat elastic urethane foam, on the order of 55 to 60 pounds per cubic foot, and a metal or thermoplastic insert, the latter designed to attach to either the deployment canister or the instrument panel. Such a construction is known as the SFI, or skin-foam-insert cover.

Another known airbag cover, the RIM/Scrin cover, is named for the reaction injection molding (RIM) process used to mold the microcellular elastomeric polyurethane cover. The scrim is the reinforcing netting laid into the tool prior to injection. The scrim is attached to a steel strip which is used to attach to the canister or the instrument panel.

Brown U.S. Pat. No(s). 3,887,214 and 3,756,617 disclose an SFI type of break-away pad construction including a pair of padded or cushion sections, each including a core of highly resilient material; such as foam materials. The core is enclosed by a protective casing formed of a plastic material, and the sections are interconnected by a joint of overlapping portions of the sections.

DISCLOSURE OF THE INVENTION

A general object of the invention is to provide an airbag cover assembly for the passenger side of the automobile dashboard, including low density, rigid or non-elastic polyurethane foam, on the order of 10 pounds per cubic foot, in conjunction with the combined use of a glass mat and nylon scrim secured to a mounting strip.

Another object of the invention is to provide an improved method of forming an airbag cover assembly.

A further object of the invention is to provide a method wherein an exterior skin is formed in a foaming tool cavity, a fabricated glass mat/nylon scrim/mounting insert is placed on the skin, and a low density polyurethane foam is injected into the tool to cover and combine with the glass mat and the nylon scrim to serve as the body of the assembly.

These and other objects and advantages of the invention will become more apparent when reference is made to the following drawings and the accompanying description.

BEST MODE OF CARRYING OUT THE INVENTION

Figure 1:
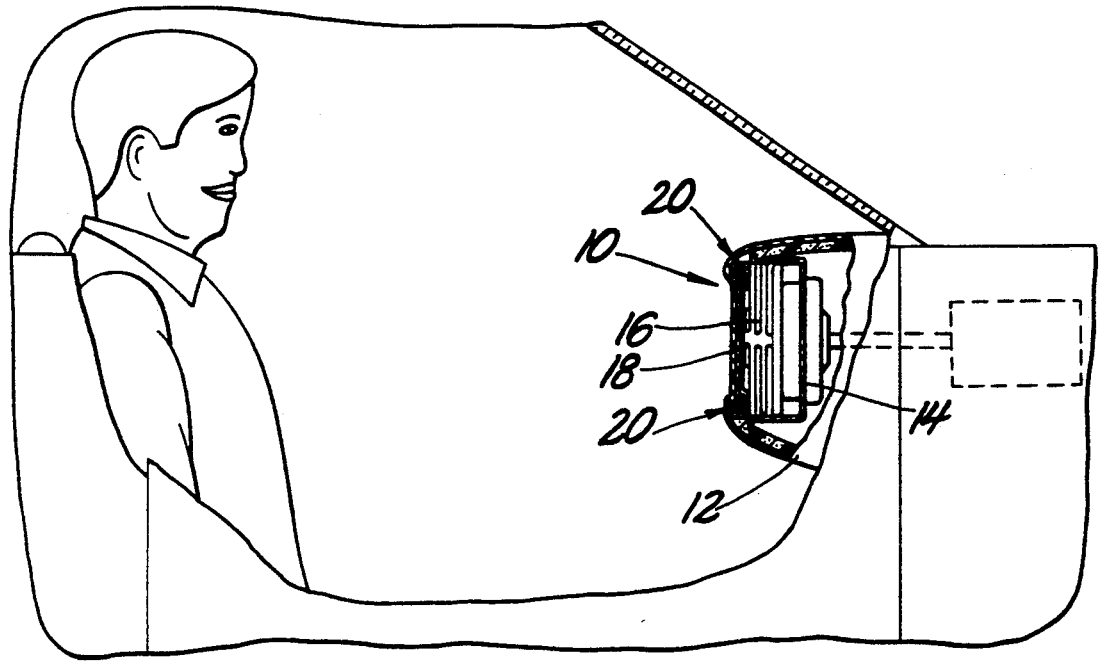
FIG. 1 is a fragmentary schematic view of an automobile embodying the inventive airbag deployment cover in an inoperative condition.
Figure 2:
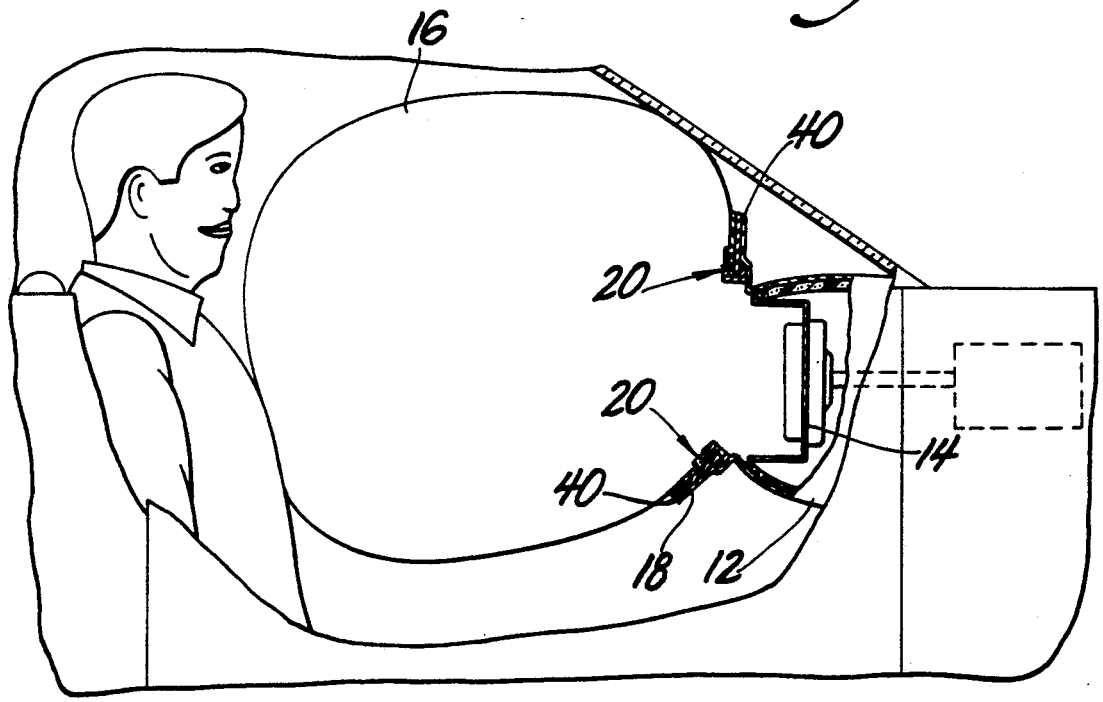
FIG. 2 is a fragmentary schematic view of the automobile embodying the inventive airbag deployment cover in its operative condition, as would occur in a collision situation.

Referring now to the drawings in greater detail, FIG. 1 illustrates an airbag cover assembly 10 mounted in the passenger side of an automobile dashboard 12. The cover assembly 10 is a break-away type, shown in its pre-broken condition secured to a canister 14 housing, an airbag 16 prior to deployment of the letter. FIG. 2 illustrates the airbag 16 fully deployed through the cover assembly 10, shown in its broken-open condition.

Figure 3:
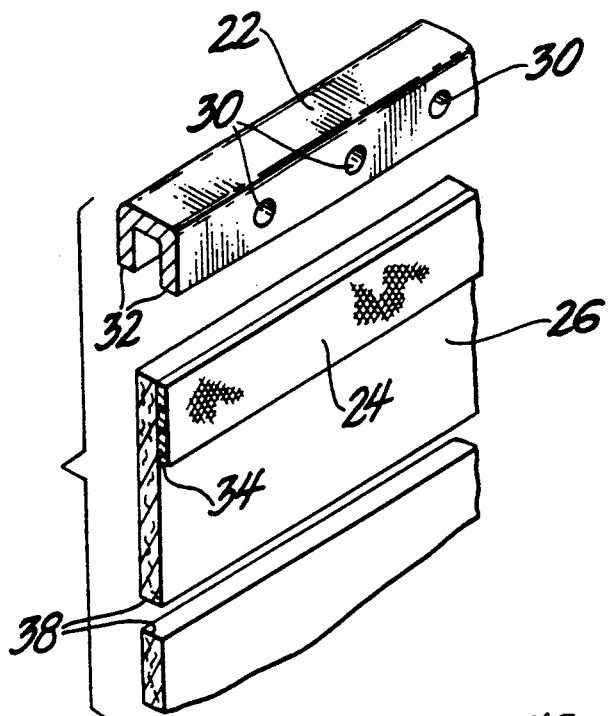
FIG. 3 is an exploded perspective view of a portion of the invention.
Figure 4:
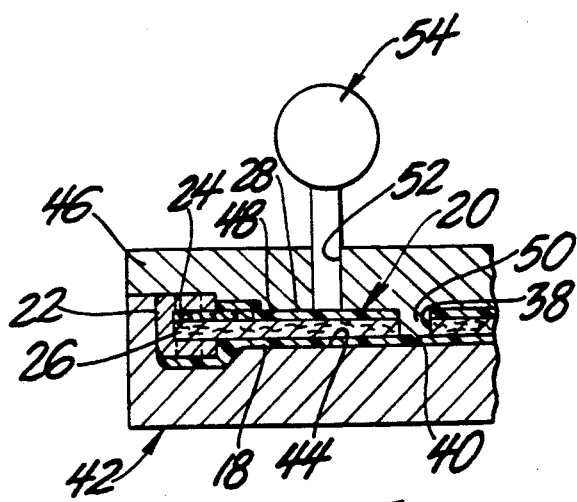
FIG. 4 is a cross-sectional view of a foaming tool and core used to form the inventive airbag deployment cover.
Figure 5:
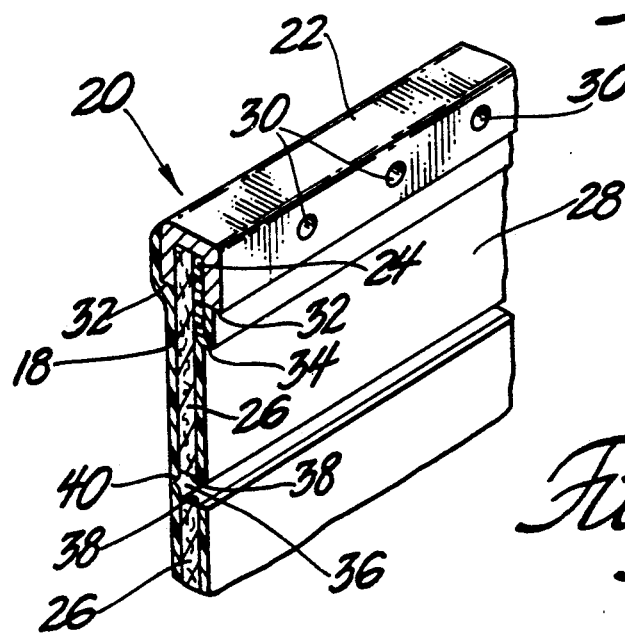
FIG. 5 is a perspective view of the back side of the inventive cover.

As better seen in FIGS. 3-5, the cover assembly 10 includes an exterior skin 18 covering a pair of spaced apart inserts or sub-assemblies 20, each of which includes a U-shaped galvanized steel mounting strip 22 adjacent the skin 18, with a short nylon scrim 24 and a long glass mat 26 sandwiched between the sides of the steel strip 22. Via a method to be described, a low density, non-elastic polyurethane foam 28 fills the interstices in the nylon scrim 24 and the glass mat 26, and covers the scrim and glass mat to a predetermined thickness. The nylon scrim 24, glass mat 26, and low density foam 28 composite structure serves as the body material behind the skin 18 when cured.

More specifically, each galvanized steel strip 22 includes a U-shaped body portion having spaced mounting holes 30 formed therein. The nylon scrim 24 is a flat strip of a size such that it abuts against the inside surface of one side of the U-shaped body portion of the steel strip 22, and extends for a short predetermined distance beyond the ends 32 of the steel strip. The glass mat 26 includes a flat body portion fitted between the nylon scrim 24 and the other inside surface of the steel strip 22, and extended beyond the edge 34 of the nylon scrim 24 to a location to be explained. The scrim 24 serves to hold the glass mat 26 together within the sides of the U-shaped mounting strip 22.

The exterior skin 18 lies against the outer surface of the glass mat 26, and thence across the width of a narrow space 36 (FIG. 5) between adjacent edges 3 of the two glass mats 26. A notch 40 is formed across the full length of the inner surface of the exterior skin 18 at the center line of the space 36, for a purpose to be described.

Referring now to FIG. 4, there is illustrated a foaming tool 42 having a cavity 44 shaped to the configuration desired for the interior of the automobile. The exterior skin 18 is formed in the cavity 44. The pairs of inserts 20, i.e., the galvanized U-shaped steel strip 22, the nylon scrim 24, and the glass mat 26 sub-assemblies, are mounted in the cavity 44, on the exterior skin 18, with a core 46 serving as a cover for the foaming tool 42 and the pair of inserts 20, and providing a space 48 adjacent the nylon scrim 24 and the glass mat 26, as shown in FIG. 4. A projection 50 of the core 46 serves to block off the space 36. An opening 52 is formed at a convenient location through the core 46, communicating with the space 48.

The low density, non-elastic polyurethane foam 28 is injected from a source under pressure, represented at 54, through the opening 52 into the space 48, filling the latter and entering through the walls of the glass mats 26 and the nylon scrims 24, to fill all the interstices in the nylon scrims and the glass mats.

When removed from the foaming tool 42 and the core 46, the cover assembly 10 is formed, as shown in FIG. 5, and adapted to being mounted on the canister 14 and/or the instrument panel, as shown in FIG. 1. Rivets or other fasteners (not shown) serve to secure the assembly to the canister edge.

It should be noted that there is a mounting strip 22 at the top and bottom edges only of the canister 14. The sides of the assembly 10 include only the glass mat 26 and foam 28, covered by the exterior skin 18.

In operation, when the automobile is involved in a collision of sufficient force to deploy the airbag 16, as shown in FIG. 2, the cover assembly 10 tears along the notch 40, with the glass mat 26, the surrounding foam 28, and the adjacent of the exterior skin 18 hinging outwardly (FIG. 2) as the airbag 16 deploys outwardly to cushion the impact of the passenger. The glass mat 26 serves to hold the low density foam 28 together and prevent it from fragmenting upon deployment.

INDUSTRIAL APPLICABILITY

It should be apparent that the invention provides an improved airbag cover assembly utilizing a low density polyurethane foam and a glass mat service to hold the foam together.

While but one embodiment of the invention has been shown and described, other modifications thereof are possible within the scope of the following claims.

The embodiments of the invention in which an exclusive property or privilege is claimed are defined as follows:

1. An airbag cover assembly comprising an exterior film of a predetermined shape, a pair of adjacent underlying subassemblies each including a mounting strip, nylon scrim, glass mat and low density foam composite structure, each of said adjacent underlying subassemblies having a free edge at one end of the composite structure, and a notch formed in the inner surface of the exterior film intermediate the adjacent sub-assemblies and extending across the width of each of said subassemblies in spaced parallelism with said mounting strips, said free edges of said composite structures engageable with said inner surface on either side of said notch for separating said exterior film at said notch therein.

2. An airbag cover assembly comprising an exterior film of a predetermined shape, a pair of adjacent underlying subassemblies each including a mounting strip, nylon scrim, glass mat and low density foam composite structure, and a notch formed in the inner surface of the exterior film intermediate the adjacent sub-assemblies, said mounting strip being U-shaped, with adjacent edge portions of said nylon scrim and glass mat clamped therebetween.

3. The airbag cover assembly described in claim 2, wherein said nylon scrim extends a predetermined short distance out of the U-shaped mounting strip, and said glass mat extends a predetermined long distance beyond said nylon scrim, providing a predetermined narrow space between adjacent edges of said pair of glass mats.

4. The airbag cover assembly described in claim 2, and a plurality of spaced apart mounting holes are formed through the sides of the U-shaped mounting strips.

5. The airbag cover assembly described in claim 2, wherein said mounting strip is formed of galvanized steel.

6. A method of forming an airbag cover assembly, said method comprising the following steps:
   a. Mounting a skin in a cavity of a foaming tool having a predetermined desired shaped;
   b. fabricating a pair of sub-assemblies, each including a U-shaped mounting strip, and side-by-side nylon scrim and glass mat clamped between the sides of the U-shaped strip and extending therefrom;
   c. mounting said pair of sub-assemblies in said foaming tool cavity on said skin, such that a predetermined narrow space exists therebetween;
   d. mounting a cover of a predetermined shape on the foaming tool;
   e. injecting a low density polyurethane foam into the foaming tool to cover and become embedded in the nylon scrim and glass mat; and
   f. allow the saturated structure to cure and remove the resultant assembly from the cavity.

7. The method described in claim 6, and forming a notch across the skin in the center of said narrow space.

* * * * *